United States Patent
Chen (10) Patent No.: US 8,761,326 B2
(45) Date of Patent: Jun. 24, 2014

(54) COMPENSATING DEVICES AND METHODS FOR DETECTING AND COMPENSATING FOR SAMPLING CLOCK OFFSET

(75) Inventor: Yi-Chuan Chen, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 295 days.

(21) Appl. No.: 13/220,049

(22) Filed: Aug. 29, 2011

(65) Prior Publication Data

US 2013/0051504 A1    Feb. 28, 2013

(51) Int. Cl.
*H04L 7/00* (2006.01)
(52) U.S. Cl.
USPC .................. 375/355; 375/316; 375/354
(58) Field of Classification Search
USPC ......................... 375/355, 316, 354
See application file for complete search history.

(56) References Cited

U.S. PATENT DOCUMENTS

| | | | | |
|---|---|---|---|---|
| 2005/0163094 A1* | 7/2005 | Okada et al. | .............. | 370/343 |
| 2006/0176968 A1* | 8/2006 | Keaney et al. | .............. | 375/260 |
| 2007/0092040 A1* | 4/2007 | Higashino | .............. | 375/327 |

FOREIGN PATENT DOCUMENTS

EP    1 933 516    6/2008

OTHER PUBLICATIONS

Ding, Z.Y., et al.; "2. Design of a MIMO-OFDM Baseband Receiver for Next-generation Wireless LAN;" IEEE; 2006; pp. 5651-5654.

* cited by examiner

*Primary Examiner* — Leila Malek
(74) *Attorney, Agent, or Firm* — McClure, Qualey & Rodack, LLP (57) ABSTRACT

A compensating device for detecting and compensating for a sampling clock offset in a receiver. An SCO detector includes multiple calculation paths and a controller. Each calculation path receives a time domain signal and a hypothetic offset, calculates correlation coefficients between the time domain signal and a delayed version of the time domain signal according to a predetermined delay and the hypothetic offset, calculates correlation coefficient sums according to the correlation coefficients, and extracts a maximum correlation coefficient sum for the hypothetic offset from the correlation coefficient sums. The controller is coupled to the calculation paths for providing different hypothetic offsets to each calculation path and detects the SCO according to the maximum correlation coefficient sums obtained from the calculation paths. An SCO compensator receives the SCO and compensating for the SCO on a signal generated in a signal processing path of a receiver.

25 Claims, 7 Drawing Sheets

COMPENSATING DEVICES AND METHODS FOR DETECTING AND COMPENSATING FOR SAMPLING CLOCK OFFSET

BACKGROUND OF THE INVENTION

1. Field of the Invention

The invention relates to an OFDM receiver, and more particularly to an OFDM receiver capable of detecting and compensating for sampling clock offset (SCO).

2. Description of the Related Art

Orthogonal frequency division multiplexing (OFDM) is a promising technology for broadband transmission due to its high spectrum efficiency, and its robustness to the effects of multipath fading channels. However, it is sensitive to synchronization errors.

Synchronization errors may occur because of carrier frequency offset and sampling clock mismatches (also called sampling clock offset (SCO)). For example, oscillator variations because of tuning oscillator instabilities or other errors can occur at both the transmitter and receiver sides. Synchronization errors may also be caused by Doppler shifts induced by a channel. Serious synchronization errors may cause two effects: symbol timing drift and inter-carrier interference.

To avoid synchronization errors, a novel OFDM receiver capable of detecting and compensating for sampling clock offset is highly required.

BRIEF SUMMARY OF THE INVENTION

Compensating devices, and methods for detecting and compensating for a sampling clock offset in a receiver are provided. An embodiment of such a compensating device for detecting and compensating for a sampling clock offset in a receiver comprises a sampling clock offset detector and a sampling clock offset compensator. The sampling clock offset detector comprises a plurality of calculation paths and a controller. Each calculation path receives a time domain signal and a hypothetic offset, calculates a plurality of correlation coefficients between the time domain signal and a delayed version of the time domain signal according to a predetermined delay and the hypothetic offset, calculates a plurality of correlation coefficient sums according to the correlation coefficients, and extracts a maximum correlation coefficient sum for the hypothetic offset from the correlation coefficient sums. The controller is coupled to the calculation paths for providing different hypothetic offsets to each calculation path and detects the sampling clock offset according to the maximum correlation coefficient sums obtained from the calculation paths. The sampling clock offset compensator is coupled to the sampling clock offset detector for receiving the sampling clock offset therefrom and compensating for the sampling clock offset on a signal generated in a signal processing path of the receiver.

An embodiment of a method for detecting and compensating for a sampling clock offset in a receiver comprises: receiving a time domain signal; delaying the time domain signal according to a predetermined delay and a plurality of different hypothetic offsets to obtain a plurality of delayed versions of the time domain signal; calculating a plurality of correlation coefficients between the time domain signal and the delayed versions of the time domain signal; calculating a plurality of correlation coefficient sums according to the correlation coefficients; obtaining a maximum correlation coefficient sum for each hypothetic offset according to the correlation coefficient sums; detecting the sampling clock offset according to the maximum correlation coefficient sums; and compensating for the sampling clock offset on a signal generated in a signal processing path of the receiver according to the detected sampling clock offset.

Another embodiment of an OFDM receiver comprises a signal processing path, a sampling clock offset detector and a sampling clock offset compensator. The signal processing path receives a radio frequency (RF) signal and processes the RF signal to obtain a processed signal. The sampling clock offset detector is coupled to the signal processing path for detecting a sampling clock offset according to a first signal generated in the signal processing path. The first signal is a time domain signal. The sampling clock offset compensator is coupled to the sampling clock offset detector for receiving the sampling clock offset and compensating for the sampling clock offset on a second signal generated in the signal processing path.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

According to the concept of the invention, the sampling clock offset (SCO) may be detected in the time domain (i.e. before performing Fast Fourier Transform (FFT)) at an OFDM receiver by using a repeat waveform, which is repeatedly carried in an OFDM signal. In an embodiment of the invention, the repeat waveform may be the waveform carried in the guard interval of the OFDM signal. For example, for the DTV system, the repeat waveform may be the waveform in the guard interval since the waveform carried in the guard interval is a repeat waveform of the tail part of an OFDM symbol. In another embodiment of the invention, the repeat waveform may be the preamble of an OFDM frame. For example, for the Wi-Fi or Wimax communications system, the repeat waveform may be the training symbols carried in the preamble of an OFDM frame.

The proposed SCO detection algorithm will be introduced in the following paragraphs. According to the embodiment of the invention, one or more hypothetic offsets $i_j$ may be first provided, where j=0~J and i, j and J are integers. Next, a plurality of correlation coefficient sums between the OFDM signal and a delayed version of the OFDM signal may then be obtained by calculating the delay correlation and moving sum for each hypothetic offset $i_j$ as:

$$C_{i_j}[n] = \sum_{k=0}^{Nt-1} r[n+k] \times r^*[n+k-N+i_j] \quad \text{Eq. (1)}$$

where r[n+k] represents the time domain OFDM signal, r*[n+k−N+$i_j$] represents the complex conjugate of the delayed version of the OFDM signal, r[n+k]×r*[n+k−N+$i_j$] represents the correlation coefficient between the OFDM signal and the delayed version of the OFDM signal, n represents the index of the correlation coefficient sum, $C_{i_j}[n]$ represents the correlation coefficient sum for index n and hypothetic offset $i_j$, k represents a variable for calculating the moving sum, Nt represents a calculation period for calculating the moving sum, and N represents a predetermined delay.

After obtaining the correlation coefficient sums $C_{i_j}[n]$ for each hypothetic offset $i_j$, a maximum correlation coefficient sum within a widow W may be obtained by finding out a peak value of the correlation coefficient sums within the time of window W using the following equation:

$$P(W_{i_j}) = \max\{|C_{i_j}[n]|\} \quad \text{Eq. (2)}$$

where $P(W_{i_j})$ represents a maximum correlation coefficient sum for the hypothetic offset $i_j$, and the window length may be flexibly selected. For example, in a preferred embodiment, the window length may be set to 1.5N.

After obtaining the maximum correlation coefficient sum for each hypothetic offset, the hypothetic offset associated with a maximum of the maximum correlation coefficient sums may be obtained as below:

$$I = \underset{i_j}{\operatorname{argmax}}\{P(W_{i_j})\} \quad \text{Eq. (3)}$$

where I represents the argument (i.e. the hypothetic offset $i_j$) of the maximum of the maximum correlation coefficient sums. Finally, the sampling clock offset may be determined according to the obtained argument by:

$$\frac{I}{N}(ppm). \quad \text{Eq. (4)}$$

As previously described, the time domain OFDM signal may comprise at least a repeat waveform repeatedly carried therein. Therefore, according to the embodiments of the invention, the calculation period Nt for calculating the moving sum is preferably selected as a length of the repeat waveform, and the predetermined delay N is preferably selected as the interval between successive repeat waveforms. For example, in the DTV system, because the repeat waveform may be the waveform carried in the guard interval between two successive OFDM symbols, the predetermined delay N may be selected as a length of an OFDM symbol, and the calculation period Nt may be selected as a length of the possible guard interval. Note that in the embodiments of the invention, the calculation period Nt does not have to be the 'exact' guard interval length in use. For example, a set of possible guard interval ratios (i.e., a ratio of the guard interval length to an OFDM symbol length), such as $$\left\{\frac{1}{4}, \frac{1}{8}, \frac{1}{16}, \frac{1}{32}, \frac{1}{128}, \frac{19}{128}, \frac{19}{256}\right\},$$

is defined in the specification. In the embodiments of the invention, the calculation period Nt may be flexibly selected from the set. For example, the calculation period Nt may be directly selected as a minimum ratio in the set so as to minimize calculation overhead. The flexibility of selecting Nt is also advantageous to designing the OFDM receiver because the guard interval length is usually different for different countries.

Figure 1:
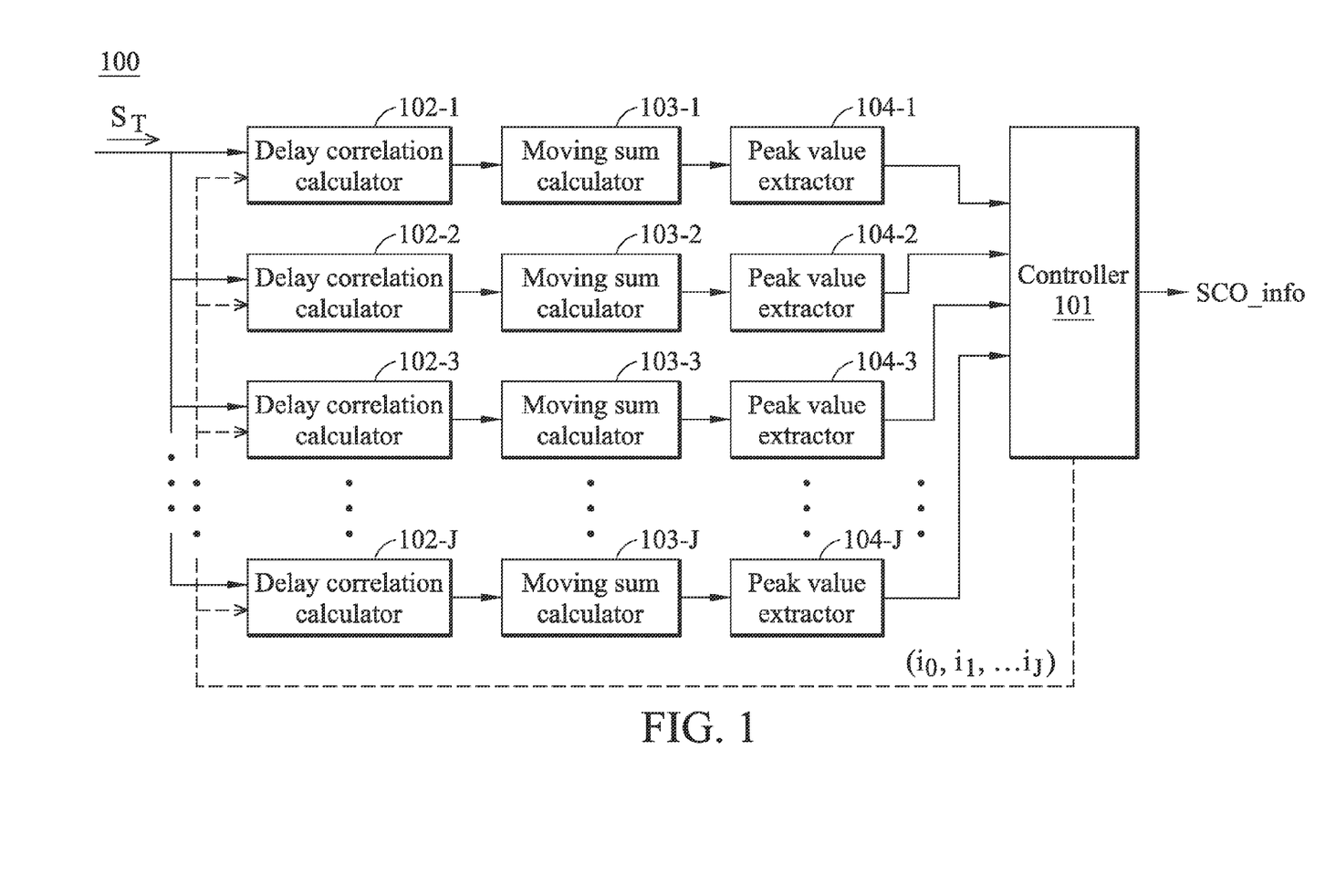
FIG. 1 shows a schematic block diagram of a sampling clock offset detector according to an embodiment of the invention.

According to the embodiments of the invention, the proposed SCO detection algorithm as previously described above may be implemented in numerous ways. For example, the embodiments may be implemented using hardware, software or a combination thereof. FIG. 1 shows a schematic block diagram of a sampling clock offset detector according to an embodiment of the invention. The sampling clock offset detector 100 is arranged to detect a sampling clock offset in a receiver, such as an OFDM receiver. The sampling clock offset detector 100 may comprise a plurality of calculation paths and a controller 101. The controller 101 is coupled to the calculation paths and provides different hypothetic offsets ($i_0$, $i_1$, ... $i_J$) to each calculation path.

Each calculation path may comprise a delay correlation calculator (the delay correlation calculator 102-1, 102-2, 102-3, ... 102-J as shown), a moving sum calculator (the moving sum calculator 103-1, 103-2, 103-3, ... 103-J as shown) and a peak value extractor (the peak value extractor 104-1, 104-2, 104-3, ... 104-J as shown). The delay correlation calculator receives the hypothetic offset $i_j$ from the controller 101, and a time domain signal $S_T$, which is generated in a signal processing path of the receiver. The delay correlation calculator 102-1, 102-2, 102-3, ... or 102-J delays the time domain signal by the predetermined delay and the hypothetic offset to obtain a delayed version of the time domain signal, and calculates the correlation coefficients between the time domain signal and the delayed version of the time domain signal.

The moving sum calculator 103-1, 103-2, 103-3, ... or 103-J calculates a moving sum of the correlation coefficients over the calculation period Nt to obtain a plurality of correlation coefficient sums $C_{i_j}[n]$ as shown in Eq. (1). The peak value extractor 104-1, 104-2, 104-3, ... or 104-J extracts the maximum correlation coefficient sum from the correlation coefficient sums within a widow W as shown in Eq. (2). The controller 101 further receives the maximum correlation coefficient sums from different calculation paths and detects the sampling clock offset by obtaining the hypothetic offset associated with a maximum of the maximum correlation coefficient sums as the sampling clock offset as shown in Eq. (3) and Eq. (4). The controller 101 may further provide information regarding the sampling clock offset SCO_info to a sampling clock offset compensator for compensating for the sampling clock offset (which will be discussed in more detail in the following paragraphs).

Figure 2:
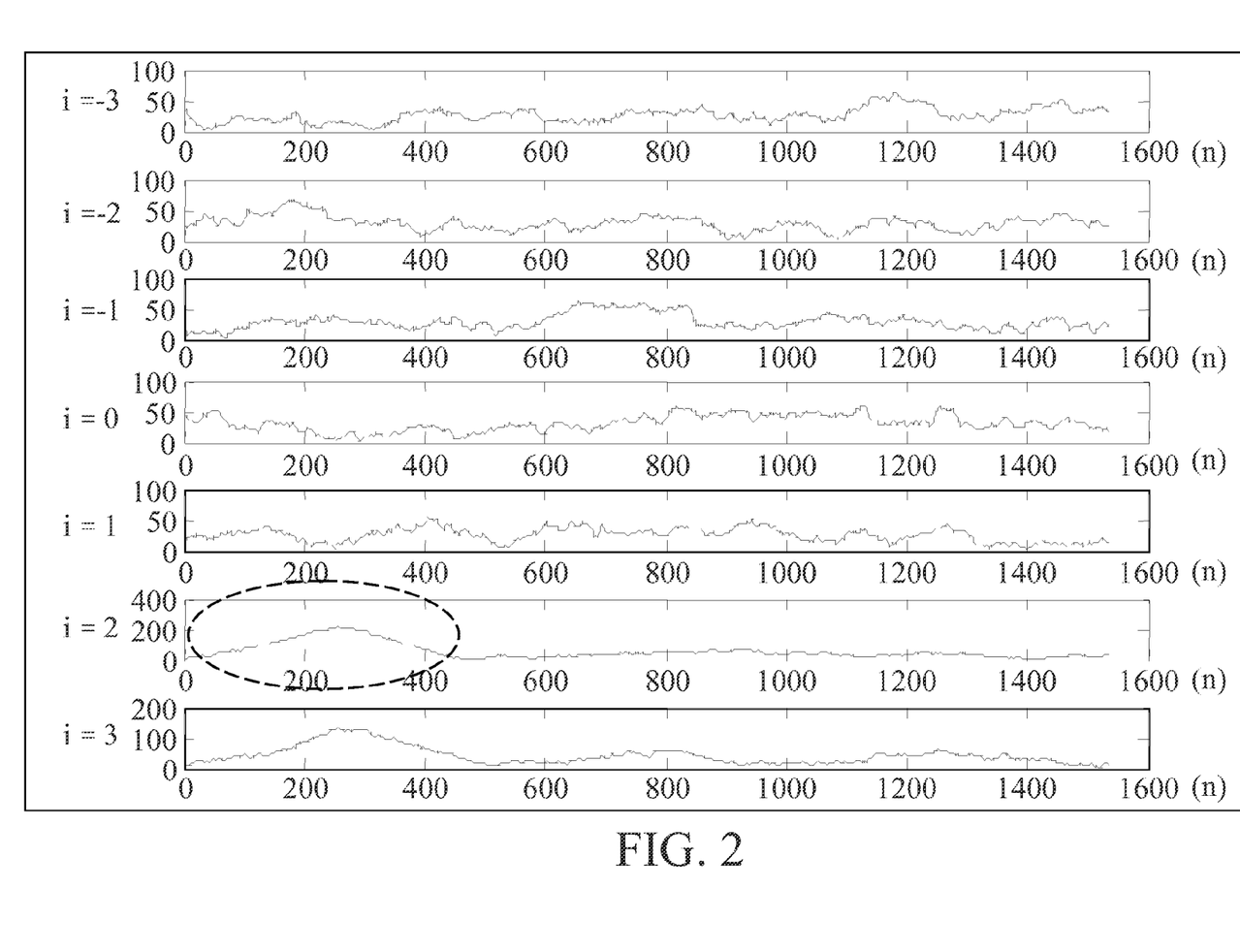
FIG. 2 shows exemplary correlation coefficient sums for different hypothetic offsets obtained by the moving sum calculators according to an embodiment of the invention.

FIG. 2 shows exemplary correlation coefficient sums for different hypothetic offsets obtained by the moving sum calculators according to an embodiment of the invention. In the embodiment, the hypothetic offsets $i_j$ may be an integer ranging from −3 to 3. Therefore, the set of hypothetic offsets $i_j$ may comprise [−3, −2, −1, 0, 1, 2, 3]. As shown in FIG. 2, the maximum of the maximum correlation coefficient sums happens when i=2 (see the peak value in the circle shown in FIG. 2). Therefore, in the embodiment, the sampling clock offset is 2/N.

Figure 3:
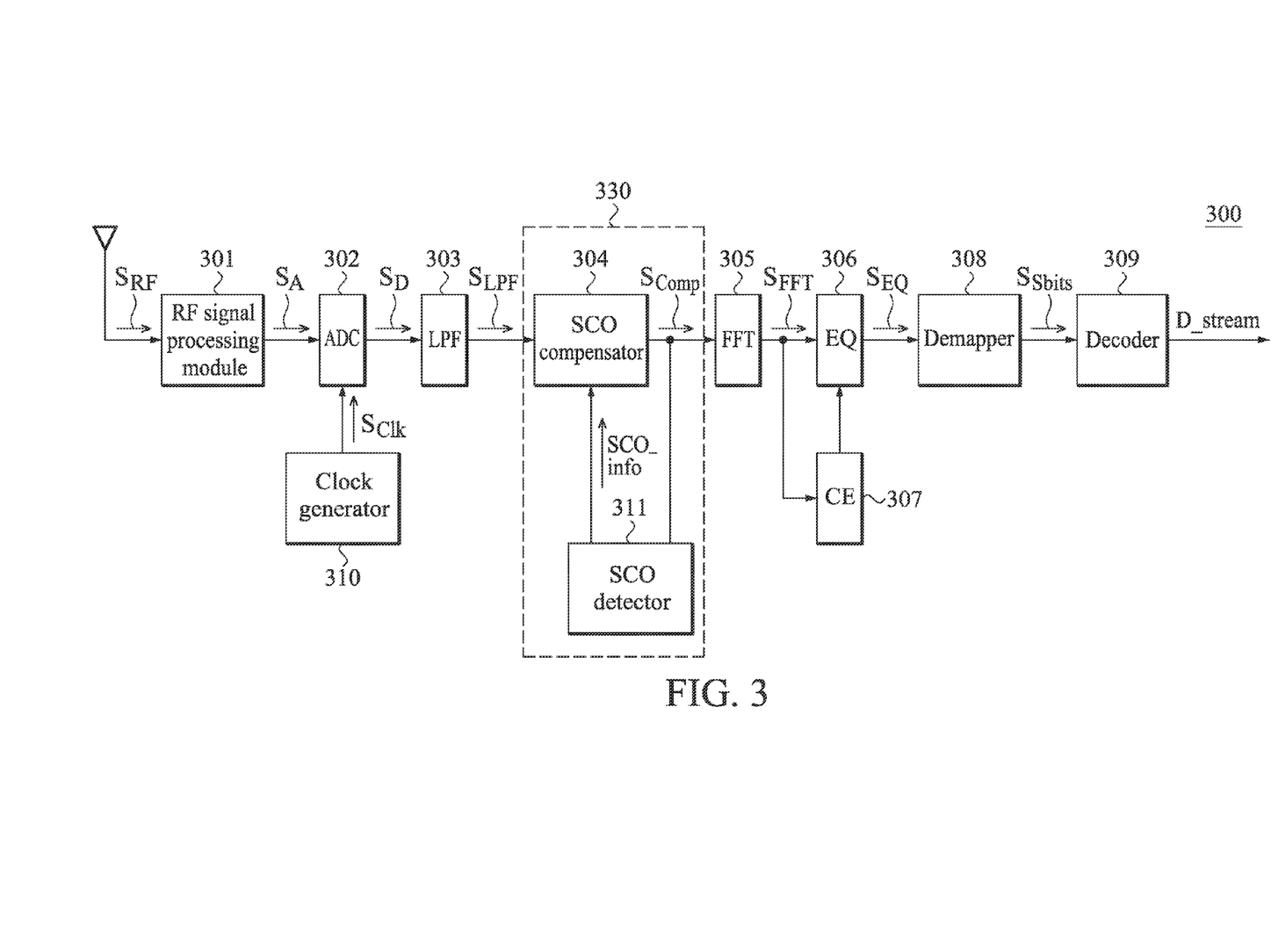
FIG. 3 shows a schematic block diagram of an OFDM receiver according to an embodiment of the invention.

According to the embodiments of the invention, the sampling clock offset compensation may be performed in either a time domain or frequency domain, and may be implemented in numerous ways. FIG. 3 shows a schematic block diagram of an OFDM receiver according to an embodiment of the invention. The OFDM receiver 300 may comprise a signal processing path for receiving a radio frequency (RF) signal and processing the RF signal to obtain a processed signal, and a compensating device 330 for detecting and compensating for a SCO in the OFDM receiver 300. The compensating device 330 may comprise an SCO detector 311 coupled to the signal processing path for detecting the SCO according to a time domain signal generated in the signal processing path, and an SCO compensator 304 coupled to the SCO detector 311 for receiving the detected SCO therefrom and compensating for the SCO on a signal generated in the signal processing path. In the signal processing path, the OFDM receiver 300 may further comprise an RF signal processing module 301, an analog to digital converter (ADC) 302, a low pass filter (LPF) 303, a Fast Fourier Transform (FFT) module 305, an equalizer (EQ) 306, a channel estimator (CE) 307, a demapper 308, a decoder 309 and a clock generator 310.

The RF signal processing module 301 receives the RF signal $S_{RF}$ and processes the RF signal $S_{RF}$ to generate a down converted signal $S_A$. Note that in the embodiments of the invention, the down converted signal $S_A$ may be an intermediate frequency (IF) signal or a baseband signal, and the invention should not be limited thereto. The ADC 302 converts the down converted signal $S_A$ according to a sampling clock signal $S_{Clk}$ generated by the clock generator 310 to obtain a digital signal $S_D$. The LPF 303 low pass filters the digital signal $S_D$ to obtain a filtered signal $S_{LPF}$. The SCO compensator 304 is coupled to the SCO detector 311 for receiving the information SCO_info regarding the detected SCO and compensates for the SCO on a signal generated in the signal processing path to generate a compensated signal $S_{Comp}$.

Note that in the embodiment, the SCO detector 311 receives the compensated signal $S_{Comp}$ as the time domain signal for SCO detection. As previously described, the SCO detector 311 may calculate a plurality of correlation coefficients between the time domain signal and a delayed version of the time domain signal according to a predetermined delay and a plurality of hypothetic offsets, calculates a plurality of correlation coefficient sums according to the correlation coefficients, extracts a maximum correlation coefficient sum for each hypothetic offset, and detects the SCO according to the hypothetic offset associated with a maximum of the maximum correlation coefficient sums. The SCO compensator 304 receives the information SCO_info regarding the detected SCO and compensates for the SCO on the filtered signal $S_{LPF}$ to generate the compensated signal $S_{Comp}$.

According to an embodiment of the invention, the SCO compensator 304 may determine a plurality of interpolation coefficients according to the detected SCO and compensates for the SCO on the filtered signal $S_{LPF}$ by performing interpolation on the filtered signal $S_{LPF}$ according to the interpolation coefficients to generate the compensated signal $S_{Comp}$. The FFT module 305 performs FFT on the compensated signal $S_{Comp}$ to generate a processed signal $S_{FFT}$.

Figure 4:
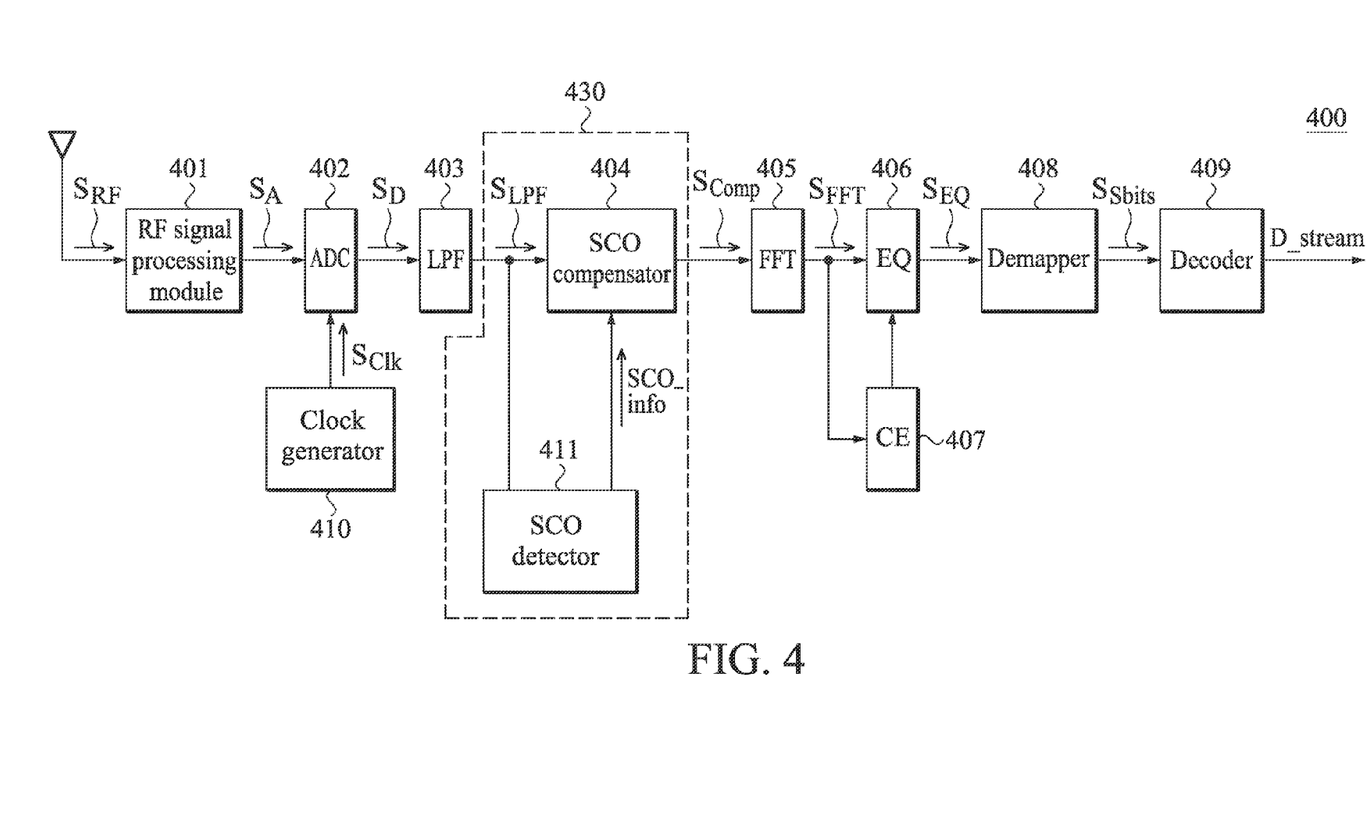
FIG. 4 shows a schematic block diagram of another OFDM receiver according to another embodiment of the invention.

The channel estimator (CE) 307 estimates the channel impulse response of a channel through which the RF signal $S_{RF}$ was received according to the processed signal $S_{FFT}$, and the equalizer (EQ) 306 compensates for the channel effect on the processed signal $S_{FFT}$ according to the channel impulse response estimated by the channel estimator (CE) 307 to generate an equalized signal $S_{EQ}$. The demapper 308 demaps the equalized signal $S_{EQ}$ according to a predetermined constellation map to generate soft bits $S_{Sbits}$. The decoder 309 receives the soft bits $S_{Sbits}$ and performs a soft decision to retrieve the data stream D_stream carried in the RF signal $S_{RF}$. For example, the data stream D_stream may be the TV signal in the DTV system, FIG. 4 shows a schematic block diagram of another OFDM receiver according to another embodiment of the invention. The OFDM receiver 400 may also comprise a signal processing path for receiving an RF signal and processing the RF signal to obtain a processed signal, and a compensating device 430 for detecting and compensating for an SCO in the OFDM receiver 400. The compensating device 430 may comprise an SCO detector 411 coupled to the signal processing path for detecting the SCO according to a time domain signal generated in the signal processing path, and an SCO compensator 404 coupled to the SCO detector 411 for receiving the detected SCO therefrom and compensating for the SCO on a signal generated in the signal processing path. In the signal processing path, the OFDM receiver 400 may further comprise an RF signal processing module 401, an ADC 402, an LPF 403, an FFT module 405, an EQ 406, a CE 407, a demapper 408, a decoder 409 and a clock generator 410. Note that the OFDM receiver 400 shown in FIG. 4 has a similar structure as the OFDM receiver 300 shown in FIG. 3, and the difference is that in the embodiment shown in FIG. 4, the SCO detector 411 receives the filtered signal $S_{LPF}$ as the time domain signal for SCO detection. Therefore, reference may be made to the OFDM receiver 300 shown in FIG. 3 for detailed descriptions of the elements in the OFDM receiver 400, and are omitted here for brevity.

Figure 5:
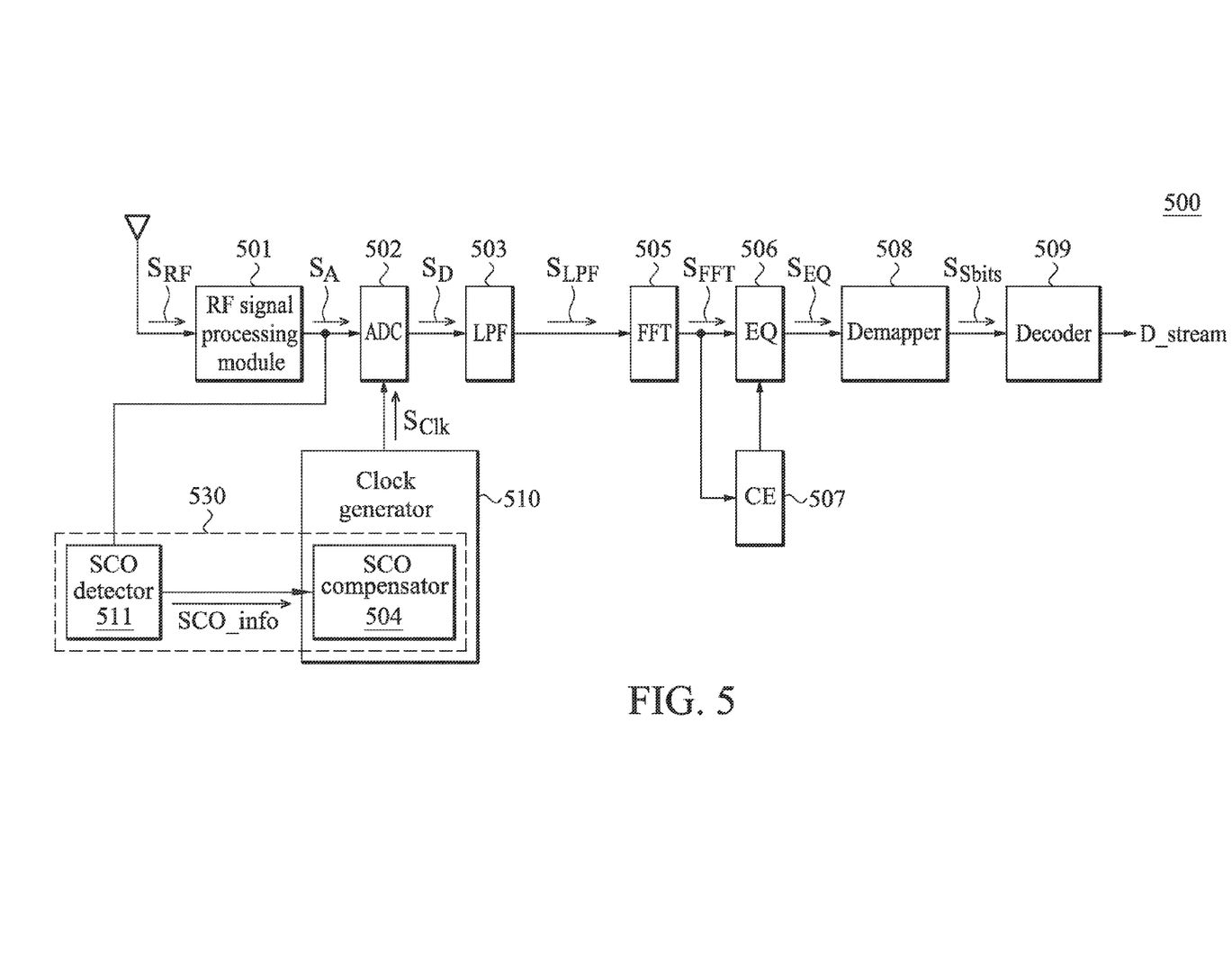
FIG. 5 shows a schematic block diagram of another OFDM receiver according to yet another embodiment of the invention.

FIG. 5 shows a schematic block diagram of another OFDM receiver according to yet another embodiment of the invention. The OFDM receiver 500 may also comprise a signal processing path for receiving an RF signal and processing the RF signal to obtain a processed signal, and a compensating device 530 for detecting and compensating for an SCO in the OFDM receiver 500. The compensating device 530 may comprise an SCO detector 511 coupled to the signal processing path for detecting the SCO according to a time domain signal generated in the signal processing path, and an SCO compensator 504 coupled to the SCO detector 511 for receiving the detected SCO therefrom and compensating for the SCO on a signal generated in the signal processing path. In the signal processing path, the OFDM receiver 500 may further comprise an RF signal processing module 501, an ADC 502, an LPF 503, an FFT module 505, an EQ 506, a CE 507, a demapper 508, a decoder 509 and a clock generator 510.

Note that in the embodiment, the SCO compensator 504 is implemented in the clock generator 510. The SCO detector 511 may receive any time domain signal generated in the signal processing path (i.e. not limited to the down converted signal $S_A$ as shown) for SCO detection and provide the information SCO_info regarding the detected SCO. The SCO compensator 504 receives the information SCO_info regarding the detected SCO from the SCO detector 511 and compensates for the SCO on the sampling clock signal $S_{Clk}$ by adjusting an oscillation frequency of the sampling clock signal $S_{Clk}$ according to the SCO. The adjustment of the oscillation frequency may be implemented in either an analog domain or digital domain. For example, the oscillation frequency may be adjusted in the analog domain by:

$$f' = f \times \left(1 + \frac{I}{N}\right)$$ Eq. (5)

where f represents the original oscillation frequency and f' represents the adjusted oscillation frequency. The oscillation frequency may also be adjusted by controlling the synthesizer setting of digital PLL or input voltage of a Voltage controlled temperature compensated crystal oscillators (VCTCXO)

Because the SCO compensator 504 is implemented in the clock generator 510, the FFT module 505 is directly coupled to the LPF 503 and performs FFT on the filtered signal $S_{LPF}$ to generate the processed signal $S_{FFT}$. Reference may be made to the OFDM receiver 300 shown in FIG. 3 for detailed descriptions of the elements in the OFDM receiver 500, and are omitted here for brevity.

Figure 6:
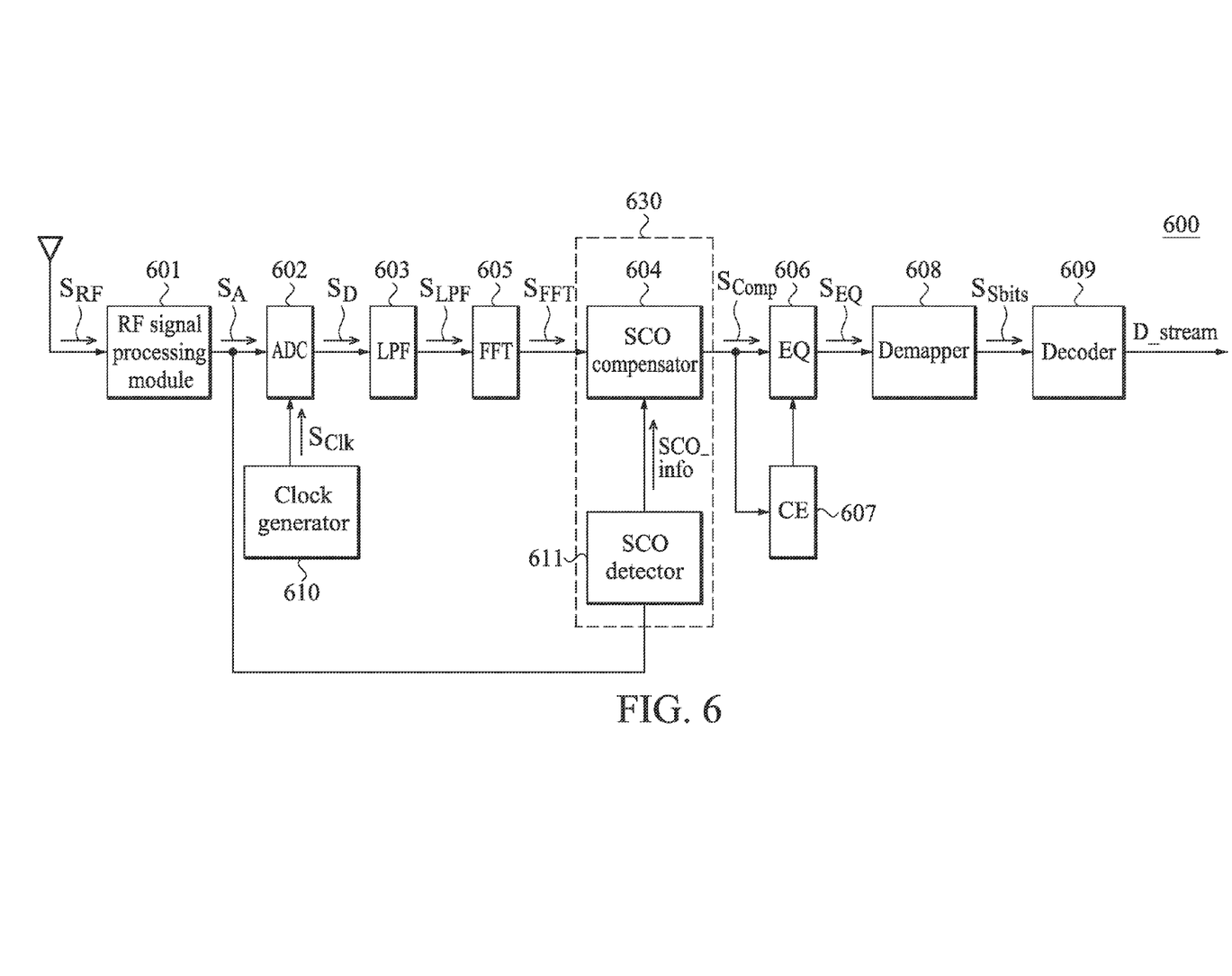
FIG. 6 shows a schematic block diagram of another OFDM receiver according to yet another embodiment of the invention.

FIG. 6 shows a schematic block diagram of another OFDM receiver according to yet another embodiment of the invention. The OFDM receiver 600 may also comprise a signal processing path for receiving an RF signal and processing the RF signal to obtain a processed signal, and a compensating device 630 for detecting and compensating for an SCO in the OFDM receiver 600. The compensating device 630 may comprise an SCO detector 611 coupled to the signal processing path for detecting the SCO according to a time domain signal generated in the signal processing path, and an SCO compensator 604 coupled to the SCO detector 611 for receiving the detected SCO therefrom and compensating for the SCO on a signal generated in the signal processing path. In the signal processing path, the OFDM receiver 600 may further comprise an RF signal processing module 601, an ADC 602, an LPF 603, an FFT module 605, an EQ 606, a CE 607, a demapper 608, a decoder 609 and a clock generator 610.

Note that in the embodiment, the SCO compensator 604 is coupled to the output of the FFT module 605 and compensates for the SCO on the processed signal $S_{FFT}$ in the frequency domain. The SCO detector 611 may receive any time domain signal generated in the signal processing path (i.e. not limited to the down converted signal $S_A$ as shown) for SCO detection and provide the information SCO_info regarding the detected SCO to the SCO compensator 604. The SCO compensator 604 receives the information SCO_info regarding the detected SCO from the SCO detector 611 and compensates for the SCO on the processed signal $S_{FFT}$ by performing frequency domain interpolation.

According to an embodiment of the invention, the SCO compensator 604 may determine a plurality of interpolation coefficients according to the detected SCO and compensates for the SCO on the processed signal $S_{FFT}$ by performing frequency domain interpolation on the processed signal $S_{FFT}$ according to the interpolation coefficients to generate the compensated signal $S_{Comp}$. Note that when compensating for the SCO in the frequency domain, it is preferable for the SCO compensator 604 to further perform inter carrier interference (ICI) cancellation. The equalizer (EQ) 606 compensates for the channel effect on the compensated signal $S_{Comp}$ according to the channel impulse response estimated by the channel estimator (CE) 607 to generate an equalized signal $S_{EQ}$. Reference may be made to the OFDM receiver 300 shown in FIG. 3 for detailed descriptions of the remaining elements in the OFDM receiver 600, and are omitted here for brevity.

Figure 7:
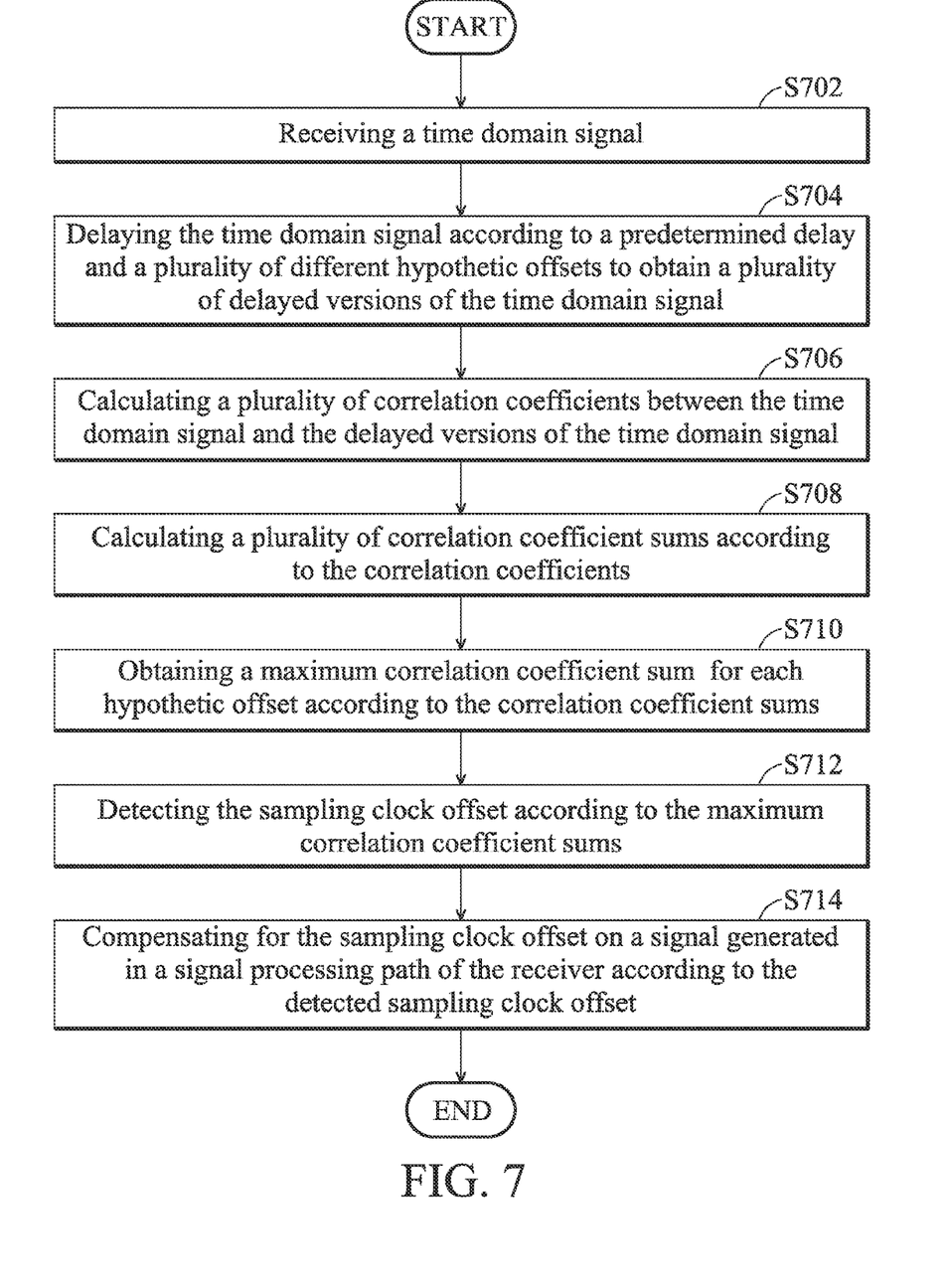
FIG. 7 shows a flow chart of a method for detecting and compensating for a sampling clock offset in a receiver according to an embodiment of the invention.

FIG. 7 shows a flow chart of a method for detecting and compensating for a sampling clock offset in a receiver according to an embodiment of the invention. A time domain signal is first received (Step S702). Next, the time domain signal is delayed according to a predetermined delay and a plurality of different hypothetic offsets to obtain a plurality of delayed versions of the time domain signal (Step S704). Next, a plurality of correlation coefficients between the time domain signal and the delayed versions of the time domain signal are calculated (Step S706). Next, a plurality of correlation coefficient sums are calculated according to the correlation coefficients (Step S708). Next, a maximum correlation coefficient sum for each hypothetic offset is obtained according to the correlation coefficient sums (Step S710). Next, the sampling clock offset is detected according to the maximum correlation coefficient sums (Step S712). Finally, the sampling clock offset is compensated on a signal generated in a signal processing path of the receiver according to the detected sampling clock offset (Step S714).

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A compensating device for detecting and compensating for a sampling clock offset in a receiver, comprising:
    a sampling clock offset detector, comprising:
        a plurality of calculation paths, each for receiving a time domain signal and a hypothetic offset, calculating a plurality of correlation coefficients between the time domain signal and a delayed version of the time domain signal according to a predetermined delay and the hypothetic offset, calculating a plurality of correlation coefficient sums according to the correlation coefficients, and extracting a maximum correlation coefficient sum for the hypothetic offset from the correlation coefficient sums; and
        a controller, coupled to the calculation paths, for providing different hypothetic offsets to each calculation path and detecting the sampling clock offset according to the maximum correlation coefficient sums obtained from the calculation paths; and
    a sampling clock offset compensator, coupled to the sampling clock offset detector for receiving the sampling clock offset therefrom and compensating for the sampling clock offset on a signal generated in a signal processing path of the receiver.

2. The compensating device as claimed in claim 1, wherein the controller detects the sampling clock offset by determining a maximum of the maximum correlation coefficient sums and obtaining the hypothetic offset associated with the maximum of the maximum correlation coefficient sums as the sampling clock offset.

3. The compensating device as claimed in claim 1, wherein each calculation path comprises:
    a delay correlation calculator, for receiving the time domain signal and the hypothetic offset, delaying the time domain signal by the predetermined delay and the hypothetic offset to obtain the delayed version of the time domain signal, and calculating the correlation coefficients between the time domain signal and the delayed version of the time domain signal.

4. The compensating device as claimed in claim 3, wherein each calculation path further comprises:
a moving sum calculator, for calculating a moving sum of the correlation coefficients over a calculation period to obtain a plurality of correlation coefficient sums; and
a peak value extractor, for extracting the maximum correlation coefficient sum for the hypothetic offset from the correlation coefficient sums.

5. The compensating device as claimed in claim 1, wherein the time domain signal comprises at least a repeat waveform repeatedly carried therein, and the predetermined delay is an interval between successive repeat waveforms.

6. The compensating device as claimed in claim 5, wherein the correlation coefficient sums are calculated by summing up the correlation coefficients over a calculation period, wherein the calculation period is a length of the repeat waveform.

7. A method for detecting and compensating for a sampling clock offset in a receiver, comprising:
receiving a time domain signal;
delaying the time domain signal according to a predetermined delay and a plurality of different hypothetic offsets to obtain a plurality of delayed versions of the time domain signal;
calculating a plurality of correlation coefficients between the time domain signal and the delayed versions of the time domain signal;
calculating a plurality of correlation coefficient sums according to the correlation coefficients;
obtaining a maximum correlation coefficient sum for each hypothetic offset according to the correlation coefficient sums;
detecting the sampling clock offset according to the maximum correlation coefficient sums; and
compensating for the sampling clock offset on a signal generated in a signal processing path of the receiver according to the detected sampling clock offset.

8. The method as claimed in claim 7, wherein the step of detecting the sampling clock offset further comprises:
determining a maximum of the maximum correlation coefficient sums; and
obtaining the hypothetic offset associated with the maximum of the maximum correlation coefficient sums as the sampling clock offset.

9. The method as claimed in claim 7, wherein the step of delaying the time domain signal further comprises:
delaying the time domain signal by the predetermined delay and different hypothetic offsets to obtain the delayed versions of the time domain signal.

10. The method as claimed in claim 7, wherein the step of calculating the correlation coefficient sums further comprises:
calculating a moving sum of the correlation coefficients over a calculation period to obtain the correlation coefficient sums.

11. The method as claimed in claim 7, wherein the time domain signal comprises at least a repeat waveform repeatedly carried therein, and the predetermined delay is an interval between successive repeat waveforms.

12. The method as claimed in claim 11, wherein the correlation coefficient sums are calculated by summing up the correlation coefficients over a calculation period, wherein the calculation period is a length of the repeat waveform.

13. An Orthogonal Frequency Division Multiplexing (OFDM) receiver, comprising:
a signal processing path, for receiving a radio frequency (RF) signal and processing the RF signal to obtain a processed signal;
a sampling clock offset detector, coupled to the signal processing path for detecting a sampling clock offset according to a first signal generated in the signal processing path, wherein the first signal is a time domain signal; and
a sampling clock offset compensator, coupled to the sampling clock offset detector for receiving the sampling clock offset and compensating for the sampling clock offset on a second signal generated in the signal processing path;
wherein the sampling clock offset detector comprises a plurality of calculation paths, each for receiving the first signal and a hypothetic offset, calculating a plurality of correlation coefficients between the first signal and a delayed version of the first signal according to a predetermined delay and the hypothetic offset, calculating a plurality of correlation coefficient sums according to the correlation coefficients, and extracting a maximum correlation coefficient sum for the hypothetic offset from the correlation coefficient sums; and a controller, coupled to the calculation paths, for providing different hypothetic offsets to each calculation path and detecting the sampling clock offset according to the maximum correlation coefficient sums obtained from the calculation paths.

14. The OFDM receiver as claimed in claim 13, wherein the signal processing path comprises:
an RF signal processing module, for receiving the RF signal and processing the RF signal to generate a down converted signal, wherein the down converted signal is an intermediate frequency (IF) signal or a baseband signal;
an analog to digital converter, for converting the down converted signal according to a sampling clock signal to obtain a digital signal; and
a low pass filter, for low pass filtering the digital signal to obtain a filtered signal.

15. The OFDM receiver as claimed in claim 14, wherein the second signal is the sampling clock signal, and the sampling clock offset compensator compensates for the sampling clock offset on the sampling clock signal by adjusting an oscillation frequency of the sampling clock signal according to the sampling clock offset.

16. The OFDM receiver as claimed in claim 14, wherein the signal processing path further comprises:
a Fast Fourier Transform (FFT) module, for performing FFT on a compensated signal to generate the processed signal,
wherein the sampling clock offset compensator is coupled between the low pass filter and the FFT module for compensating for the sampling clock offset on the filtered signal to generate the compensated signal.

17. The OFDM receiver as claimed in claim 16, wherein the first signal is the filtered signal.

18. The OFDM receiver as claimed in claim 16, wherein the first signal is the compensated signal.

19. The OFDM receiver as claimed in claim 16, wherein the sampling clock offset compensator further determines a plurality of interpolation coefficients according to the sampling clock offset and compensates for the sampling clock offset on the filtered signal by performing interpolation on the filtered signal according to the interpolation coefficients to generate the compensated signal.

20. The OFDM receiver as claimed in claim 14, wherein the signal processing path further comprises:

a Fast Fourier Transform (FFT) module, for performing FFT on the filtered signal to generate a processed signal, wherein the sampling clock offset compensator is coupled to the FFT module for compensating for the sampling clock offset on the processed signal.

21. The OFDM receiver as claimed in claim 13, wherein the controller detects the sampling clock offset by determining a maximum of the maximum correlation coefficient sums, and obtaining the hypothetic offset associated with the maximum of the maximum correlation coefficient sums as the sampling clock offset.

22. The OFDM receiver as claimed in claim 13, wherein each calculation path comprises:

a delay correlation calculator, for receiving the first signal and the hypothetic offset, delaying the first signal by the predetermined delay and the hypothetic offset to obtain the delayed version of the first signal, and calculating the correlation coefficients between the first signal and the delayed version of the first signal.

23. The OFDM receiver as claimed in claim 22, wherein each calculation path further comprises:

a moving sum calculator, for calculating a moving sum of the correlation coefficients over a calculation period to obtain a plurality of correlation coefficient sums; and a peak value extractor, for extracting the maximum correlation coefficient sum for the hypothetic offset from the correlation coefficient sums.

24. The OFDM receiver as claimed in claim 13, wherein the first signal comprises at least a repeat waveform repeatedly carried therein, and the predetermined delay is an interval between successive repeat waveforms.

25. The OFDM receiver as claimed in claim 24, wherein the correlation coefficient sums are calculated by summing up the correlation coefficients over a calculation period, wherein the calculation period is a length of the repeat waveform.

\* \* \* \* \*